US012784022B2

(12) United States Patent
Sirotkin et al.

(10) Patent No.: US 12,784,022 B2
(45) Date of Patent: Nov. 3, 2026

(54) DELAYED ITEM TRANSACTION PROCESSING

(71) Applicant: NCR Voyix Corporation, Atlanta, GA (US)

(72) Inventors: William Sirotkin, Roswell, GA (US); Yatharth Bhargava, Atlanta, GA (US); Gyubin Choi, Atlanta, GA (US); Gina Torcivia Bennett, Lawrenceville, GA (US); Kip Oliver Morgan, Atlanta, GA (US); Noah Tyler Gardner, Dacula, GA (US)

(73) Assignee: NCR Voyix Corporation, Atlanta, GA (US)

( * ) Notice: Subject to any disclaimer, the term of this patent is extended or adjusted under 35 U.S.C. 154(b) by 396 days.

(21) Appl. No.: 18/088,868

(22) Filed: Dec. 27, 2022

(65) Prior Publication Data

US 2024/0211915 A1 Jun. 27, 2024

(51) Int. Cl.

*G06Q 20/00* (2012.01)
*G06Q 10/087* (2023.01)
*G06Q 20/20* (2012.01)

(52) U.S. Cl.

CPC ......... *G06Q 20/203* (2013.01); *G06Q 10/087* (2013.01)

(58) Field of Classification Search

CPC .... G06Q 20/203; G06Q 10/087; G06Q 20/20; G06Q 30/0201; G06Q 30/0631; G06Q 20/18; G07G 1/01; G07G 1/0009; G07G 1/0036

See application file for complete search history.

(56) References Cited

U.S. PATENT DOCUMENTS 6,123,259 A * 9/2000 Ogasawara ........ G06Q 30/0267 705/14.1
10,846,775 B1 * 11/2020 Dai .................... G06Q 30/0631
2021/0326964 A1 * 10/2021 Isaacson ............ G06Q 30/0633

* cited by examiner

*Primary Examiner* — Rokib Masud

(74) *Attorney, Agent, or Firm* — Schwegman Lundberg & Woessner, P.A.

(57) ABSTRACT

A user interface of a terminal is enhanced to provide a screen depicting suggested items for purchasing by a customer before completing a transaction at the terminal. The suggested items can include items likely to have been forgotten by the customer based on the current basket of items in the transaction and/or items that are otherwise related to the current basket of items. Any suggested item selected by the customer for adding to the transaction is communicated to a server. The server maintains a data structure for transactions that require items to be picked up and current statuses for item picking transactions. Store-operated devices allow in-store pickers to select items that need to be picked from the store for the transactions identified in the data structure. When a picker acquires the items from store shelves, the items are delivered to a designated area of the store and the customer retrieves the items from that area.

2 Claims, 5 Drawing Sheets

DELAYED ITEM TRANSACTION PROCESSING

BACKGROUND

People frequently forget things while shopping. Often, the shopper realizes they forgot an item while in line, while checking out, or worse yet, not until they leave the store. It takes a shopper a lot of time to step out of line and find those forgotten items. Allowing shoppers to browse through an entire store's catalog for forgotten items at self-checkout can slow transaction throughput and frustrate other shoppers waiting to checkout. A cashier asking if the shopper was able to find all items they needed seems disingenuous and off-putting to some shoppers.

After completing a transaction without one's forgotten items, it is difficult to head back into the store with bags in hand; one feels as if they are being viewed as a potential thief due to already having bags in their hands as they re-enter the store. Moreover, even if the shopper does return to the store to pick up the forgotten items, they must again wait in line to perform another transaction.

Another complication is that some credit cards may view two small transactions requested close in time and originating from a same store location as potential fraud and deny the second transaction, creating further embarrassment for a shopper. Most times the shopper simply does not remember the items until they return home with their purchased items. Consequently, the shopper may not even return to the store for the forgotten items and the retailer misses out on sales they could have made if the shopper had remembered when at the store.

SUMMARY

In various embodiments, methods and a system for delayed item processing are presented. During a transaction, the user interface of a transaction manager at a transaction terminal is enhanced to present one or more screens to the customer asking the customer if they forgot an item, want to add an item, and/or considered purchasing a related item. A transaction history of the customer and transaction histories for customers of a store as a whole are processed along with the customer's current basket of items recorded in the transaction to determine any forgotten and/or related items. The forgotten and/or related items are displayed in the transaction screens and are selectable by the customer. The transaction screens also permit the customer to manually enter a forgotten item. When the customer selects an item to add to the transaction, the transaction manager sends the newly added item to a server-based item pick coordinator, which posts the transaction identifier for the transaction and the item needed for the transaction in interface screens on store-operated devices.

A pick manager identifies when an employee has selected a transaction to pick the corresponding item and the item coordinator updates the interface screens on the store-operated devices so that other employees are aware of who is handling the transaction. The item coordinator updates when items for the transaction are placed in a designated customer pickup area as indicated by the pick manager. Following payment for the transaction, the customer goes to the pickup area and retrieves the additional item(s) they desired but did not have when performing the transaction at the terminal.

DETAILED DESCRIPTION

Figure 1A:
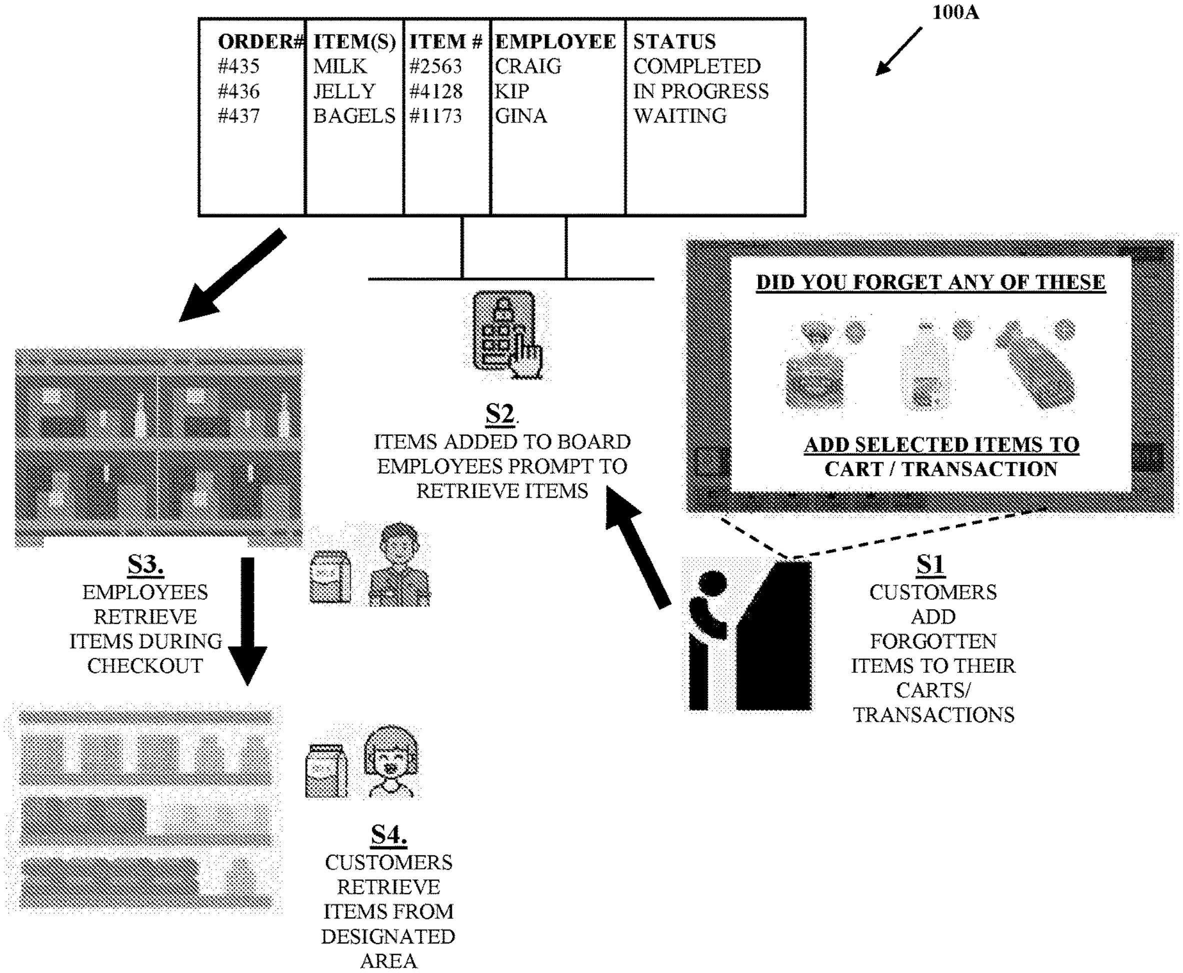
FIG. 1A is a pictorial diagram of a system for in-store delayed item processing, according to an example embodiment.

Forgetting to obtain all desired items while a customer is at a store is frustrating to both the customer and the store. The customer is inconvenienced, and the store may or may not eventually sell the forgotten items to the customer. Even when a customer did not forget any item during a transaction, the store has an opportunity to upsell the customer with additional related items that relate to the items the customer is purchasing when a customer is at a store terminal for their transaction. However, upselling needs to include items that the customers are likely to purchase and if the proposed upsell items are unrelated, customers will soon ignore any subsequent upsell attempts by the store. Permitting the customer to add items to a current transaction has a number of logistical challenges for both the customer and the store because the customer does not want to go back into the store and perform a second transaction and the store cannot dedicate staff to be available at the terminals to make runs into the store to get the items while other customers are waiting to checkout at the terminal.

The teachings presented herein and below solve the aforementioned technical challenges by providing a technical solution that includes workflows, interface enhancements, and processes for in-store delayed item processing. A machine learning model (MLM) is trained on customer transaction histories and a store's transaction history as a whole to—when provided a given basket of items for a given customer transaction as input—provide as output an identification of items that were either forgotten by the customer or are related to the basket of items and not currently included in the basket of items. A transaction user interface is enhanced to present the customer with screens that depict the suggested items to add to the transaction when the customer is ready to pay for the transaction and conclude the transaction at a terminal. Any selected suggested item causes interface screens on store-operated devices to be updated to include the customer-selected item with the transaction. Employees operating the store-operated devices voluntarily select the transactions which they can handle, retrieve the items from their locations in the store, and bring the items to a designated store area where customers can pick up the late-ordered items. These late-ordered items are already paid for by the customers when they were added to their transactions, such that the customers simply show a transaction receipt and pick up their items from the designated area.

A status screen may be rendered on the store devices. The status screen may present employees with statuses of transactions requiring picked items for delayed item processing. When an employee selects a transaction, the transaction status is updated to identify the employee and to provide an in-progress state within the status screen. When an employee delivers the forgotten items for a transaction to the designated area, the status screen for that transaction is updated to completed within the status screen. If no employee has yet accepted a transaction to pick items, the status screen for that transaction is reflected with a waiting status.

The terms “customer,” “consumer,” and “shopper” may be used herein interchangeably and synonymously and may refer to an individual conducting a transaction at a terminal who has an opportunity to add one or more items to the transaction before paying for the transaction at the terminal.

The terms “picker,” “employee,” or “staff member” may be used herein interchangeably and synonymously and may refer to an individual who works for a store and is assigned voluntarily or involuntarily to pick delayed items for the transactions.

FIG. 1A is a pictorial diagram 100A of a system for in-store delayed item processing, according to an example embodiment. The diagram 100A is shown in greatly simplified form for purposes of providing an overview of the process flow for delayed item processing.

At S1, a customer is operating a terminal to perform a self-checkout for a basket of items being purchased by the customer. The customer's identifying information (e.g., a loyalty account identifier) and the items in the basket are sent to a server for analysis during the transaction. Based on the customer's transaction history, the analysis considers whether one or more items the customer has forgotten to purchase are absent from the basket of items.

For example, a customer's transaction history may show that when the customer purchases eggs, over 90% of the time the customer also purchases milk. In this example, if eggs are present in the basket but milk is not, the analysis may determine that milk is a forgotten item for the customer. As another non-limiting example, every two weeks a customer may purchase milk. If the basket of items does not include milk and the customer's transaction history indicates that it has been more than two weeks since the customer purchased milk, the analysis may determine that milk is a forgotten item.

In other examples, the basket of items as a whole may be evaluated in view of the store's transaction history to identify related items that are not present in the basket rather than customer-forgotten items. For example, if customer transaction histories across multiple customers indicate that 80% of store customers buy bread when purchasing both milk and eggs, the presence of milk and eggs in a customer's basket along with the absence of bread may indicate that bread is a related item to suggest to the customer.

In example embodiments, the transaction user interface is enhanced to display suggested forgotten and/or related items to the customer before the customer completes the transaction by making a payment for the customer's basket of items. A screen is rendered with an interface option for the customer to select one or more of the suggested items to add to their current basket of items. When the customer selects one or more of the suggested items, this causes the transaction identifier for the transaction, the item descriptions for the selected items, and the item numbers that identify the items within the store to be posted through an interface screen on displays of store-operated devices as shown at S2.

Employees select a transaction to handle from the interface screens of their devices. As employees are assigned to transactions that require items to be picked up (hereinafter “item picking transactions”), the statuses of the transactions are updated within the interface screens accordingly. This enables employees to be aware of what transactions have been handled/completed, what are in-progress, and what are still awaiting selection by an employee for handling. This enables idle employees to stay busy and allows employees who are regularly stationed in areas where items that need to be picked up are located to quickly accept an item picking transaction, thereby making more efficient use of the store's labor.

When a given employee agrees to pick an item for an item picking transaction, the employee retrieves the item from the store shelves as depicted at S3. The employee then delivers the item to a designated delayed item pickup location within the store, from where the customer can retrieve the item as depicted at S4. The technology disclosed herein encompasses a variety of additional embodiments and additional features for implementing the workflow associated with diagram 100A, which will now be discussed with reference to FIGS. 1B, 2, and 3 below.

Figure 1B:
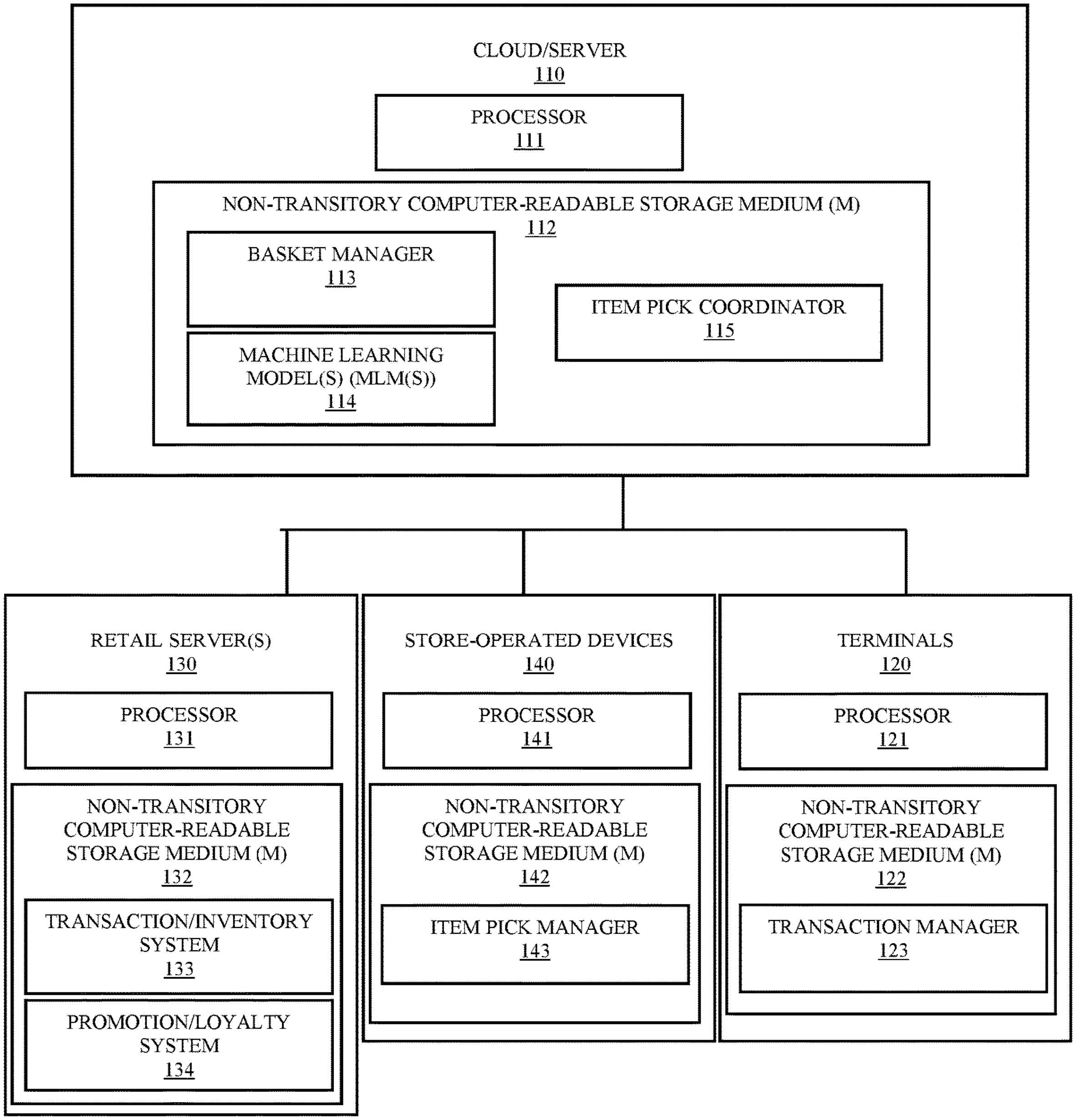
FIG. 1B is a block diagram of the system for in-store delayed item processing, according to an example embodiment.

FIG. 1B is a block diagram of the system 100B for in-store delayed item processing, according to an example embodiment. It is to be noted that the components are shown schematically in greatly simplified form, with only those components relevant to understanding of the embodiments being illustrated.

Furthermore, the various components that are identified in FIG. 1B are illustrated, and the arrangement of the components is presented, for purposes of illustration only. It is to be noted that other arrangements with more or less components are possible without departing from the teachings of in-store delayed item processing as presented herein above and below.

System 100 includes a cloud/server 110, a plurality of terminals 120, one or more retail servers 130, and a plurality of store-operated devices 140. Cloud/Server 110 includes at least one processor 111 and a non-transitory computer-readable storage medium 112 (herein after just “medium”), which includes executable instructions for a basket manager 113, executable instructions for one or more machine learning models (MLMs) 114, and executable instructions for an item pick coordinator 115. The executable instructions, when executed by processor 111, cause processor 111 to perform respective operations discussed herein and below in connection with 113-115.

Each terminal 120 includes a processor 121 and a non-transitory computer-readable storage medium 122. Medium 122 includes executable instructions for a transaction manager 123, which when executed by processor 121 cause processor 121 to perform operations discussed herein and below in connection with 123.

Each retail server 130 includes a processor 131 and a non-transitory computer-readable storage medium 132, which includes executable instructions for a transaction/inventory system 133 and executable instructions for a promotion/loyalty system 134. The executable instructions, when executed by processor 131, cause processor 131 to perform respective operations discussed herein and below in connection with 133 and 134.

Each store-operated device 140 includes a processor 141 and a non-transitory computer-readable storage medium 142, which includes executable instructions for an item pick manager 143. The executable instructions, when executed by processor 141, cause processor 141 to perform operations discussed herein and below in connection with 143.

According to example embodiments of the disclosed technology, an enhanced workflow of transaction manager 123 provides transaction details for items being purchased in a transaction, as well as any available customer loyalty account information for a customer of the transaction, to basket manager 113 before the transaction is paid and concluded on terminal 120. Transaction manager 123 is further enhanced to receive suggested items back from basket manager 113 and render a new interface screen to display the suggested items to the customer. Still further, the new interface screen includes options that allow the customer to select a given suggested item and/or manually enter an item forgotten by the customer. Transaction manager 123 then processes any selected suggested items and/or entered items as part of the basket of items being processed in the transaction for the customer. In this manner, items are added to a customer's basket for a current transaction and the transaction is completed and paid for without those items actually being in the customer's possession at the time the transaction is concluded at the terminal. Moreover, transaction manager 123 sends the suggested item identifiers, a transaction identifier for the transaction, and any available customer loyalty account identifier back to item pick coordinator 115.

Upon receipt of the given transaction identifier, the set of added item identifiers, and any customer loyalty account identifier from transaction manager 123, coordinator 115 updates a current list of delayed item processing transactions to include the received transaction and corresponding information. Coordinator 115 maintains a data structure, such as a table, where each record within the data structure includes a transaction identifier, one or more items to be picked for the transaction that corresponds to the transaction identifier, an employee/picker name (if assigned), and a current item picking status for the transaction.

A current version of the data structure is rendered within a user interface screen of item pick manager 143 on each of the store-operated devices 140. When an employee selects a transaction from the interface screen via the item pick manager 143, item pick manager sends the employee name back to item coordinator 115 and coordinator 115 updates the current status from waiting to in-progress. When the employee delivers the item(s) for an assigned transaction to a designated area, the employee indicates that the items for the transaction were delivered to the designated area via the user interface of item pick manager 143 on the corresponding device 140 operated by the employee. Item pick manager 143 then notifies coordinator 115, and coordinator 115 updates a current status for the corresponding transaction within the data structure to completed.

After the customer has added the forgotten or suggested related items to their transaction and paid for them via the terminal 120, the customer goes to the designated store area, where the picked items were delivered. The customer shows a clerk their receipt and the clerk matches the transaction identifier to the corresponding item(s) picked and placed in the designated area.

Basket manager 113 receives a customer loyalty account identifier for a customer in addition to a transaction identifier for a transaction being processed by or on behalf of a customer at a terminal 120 and item codes for items in a given basket of the customer. The basket manager 113 then uses the customer loyalty account identifier to retrieve a customer transaction history from promotion/loyalty system 134. The basket of items are labeled as input features and provided to a trained MLM 114 as input. The MLM 114 returns, as output, a list of additional item codes, which may be sorted from highest confidence that the item is a forgotten item to lowest confidence that the item is a forgotten item. Manager 113 then uses a confidence threshold (e.g., a percentage threshold or a threshold total number of items) to select the one or more item codes from the list that correspond to items likely to have been forgotten by the customer. The selected item codes are then sent to transaction manager 123 and transaction manager 123 obtains the item details and information for those items and presents the items as suggested items within the transaction user interface screen on a display of terminal 120 that are selectable by the customer.

In an embodiment, basket manager 113 can also label the item codes for the basket of items as input features to a second MLM 114, which is trained on transaction histories for customers of the retail store as a whole to output, to the basket manager 113, the top N related items for the basket of items. Basket manager 113 provides the N related item codes to transaction manager 123. Transaction manager 123 obtains item details and information for the related items and presents the related items as suggested items within the user interface screen on the display of terminal 120 that are selectable by the customer.

In an embodiment, basket manager 113 uses a first MLM 114 to obtain forgotten items and a second MLM 114 to obtain related items. In some embodiments, basket manager 113 may provide both X potentially forgotten items and Y related items to transaction manager 123, in which case, transaction manager 123 may present two separate interface screens (one for the forgotten items and one for the related items) to the customer before the customer is permitted to pay for their basket of items at the terminal 120.

In an embodiment, basket manager 113 only uses the second MLM 114 to obtain a certain number of related items to the basket of items if the first MLM 114 fails to return any suggested forgotten items for the basket. In this way, transaction manager 123 presents just a single interface screen for suggested items to the customer and the suggested items are either forgotten items for the basket of items or related items for the basket of items in the scenario in which the first MLM 114 fails to identify any suggested forgotten items for the customer and the customer's basket of items.

In an embodiment, the first MLM 114 is trained to consider factors of a customer's transaction history that includes such information as frequency with which given items were purchased by the customer, the time elapsed between multiple separate purchases of a same item by the customer, patterns of a subset of items purchased together in transactions by the customer, each pattern's frequency of occurrence, and time elapsed between separate purchases of the set of items (or subsets of the set of items) associated with a given pattern. In an embodiment, the second MLM 114 is trained to consider factors associated with baskets of items plotted in multidimensional space along with individual item codes for items offered by the store. For example, the distances between the customer's current basket of items and other plotted items or other plotted baskets may determine whether the second MLM 114 identifies a suggested item as a related item to the current basket of items.

In an embodiment, the first MLM 114 and the second MLM 114 provide item codes as output. Each item code may be assigned a probability or a percentage indicating a likelihood/confidence that the corresponding item is a customer forgotten item (in the case of output from the first MLM 114) or indicating a likelihood/confidence that the customer would purchase the related item (in the case of output from the second MLM 114). Each of MLM 114 and 115 may provide the output as a list in which the item codes are sorted from highest likelihood/confidence to lowest likelihood/confidence. In example embodiments, basket manager 113 follows a set of heuristics to select, in the alternative, the top N item codes having the highest associated confidence values. Based on the heuristics, the basket manager 113 may select, the top N item codes having the highest confidence values from just the output of the first MLM 114, the top N item codes having the highest confidence values from just the output of the second MLM 114, or the top N item codes having the highest confidence values from a combination of the output from the first MLM 114 and the output from the second MLM 114.

In an embodiment, at least one store-operated device 140 is a large display maintained in an employee lounge area or other areas where employees gather within the store. Each employee's mobile device executing a mobile application for item pick manager 143 can also be considered a store-operated device 140. Employees can view the status of item picking transactions, access their phone's item pick manager 143, and select transactions to handle.

In an embodiment, when employees are finished picking items for a transaction, the items are delivered by the employees directly to the customers at or adjacent to the terminals that the customers used to perform the transaction. For example, suppose a customer adds milk as a delayed item for purchase during the transaction. An employee receives notice of the transaction, picks the milk from the milk section of the store, and delivers the milk to the customer at the terminal or adjacent to the terminal when a different customer is now operating the terminal for another transaction.

In an embodiment, one or both of the MLMs 114 are trained to adjust forgotten items and/or related items based the proximity of a given transaction to holidays and/or particular seasons of the year. For example, hot dogs and baked beans may be more likely to be forgotten and/or related items to a given basket of items when the transaction is between June $27^{th}$ and July Fourth, and thus, may be weighted more heavily during this time period. The proximity of a given transaction to a given holiday or season can be a configurable parameter evaluated or considered by the MLMs 114.

In an embodiment, the terminal 120 can be a self-service terminal (SST) operated by the customer for self-checkouts or the terminal can be a point-of-sale (POS) terminal operated by an employee on behalf of the customer during a cashier-assisted transaction. In this way, customers engaged in cashier-assisted transactions can be presented suggested items to add via a customer-facing display of POS terminal 120. The customers can then add the items to the transaction and receive the added items within the designated area, at the POS terminal 120, and/or adjacent to the POS terminal 120 when the cashier has started a next transaction at the terminal 120 for a different customer.

Figure 2A:
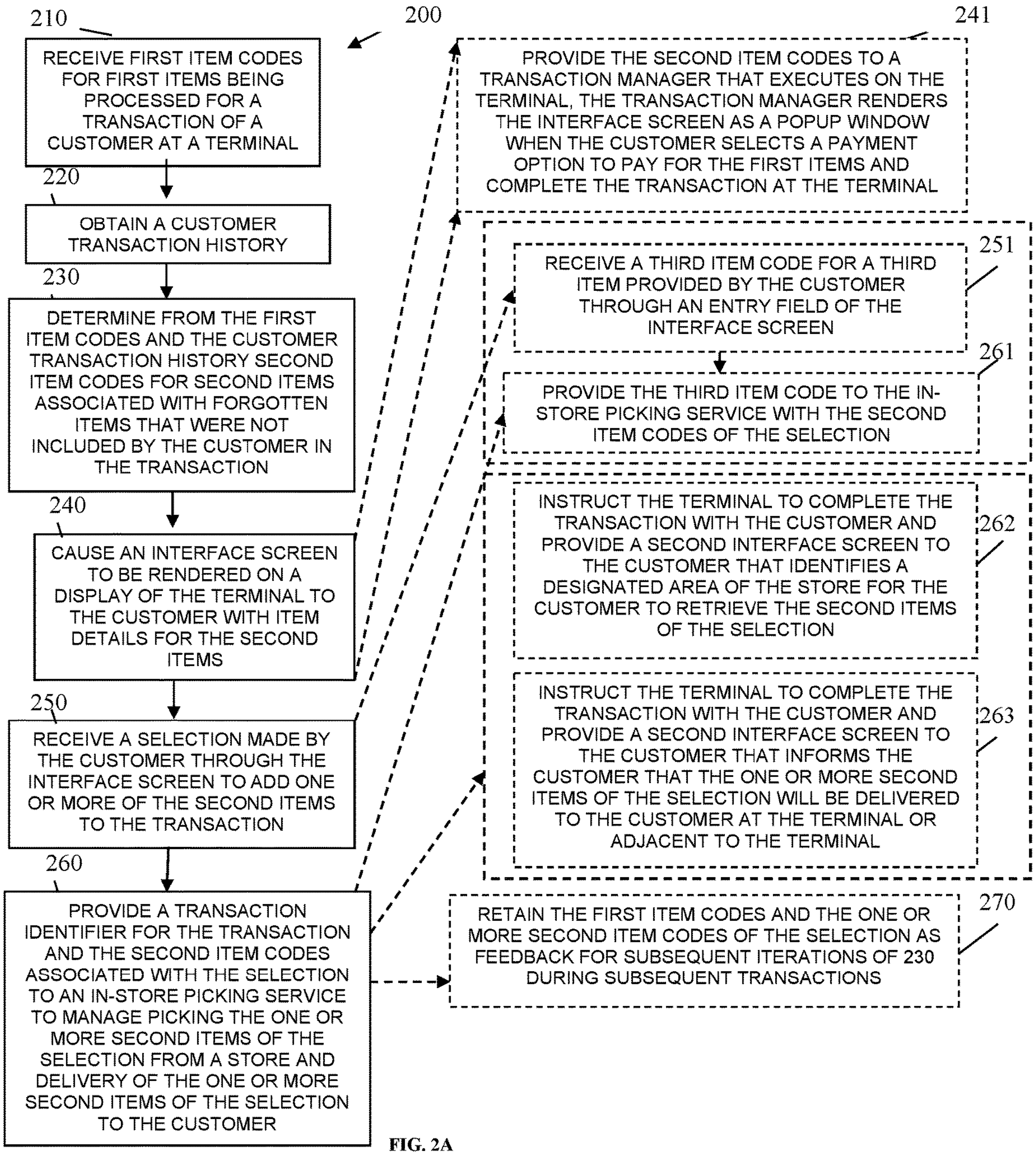
FIG. 2A is a flow diagram of a method for in-store delayed item processing, according to an example embodiment.
Figure 2B:
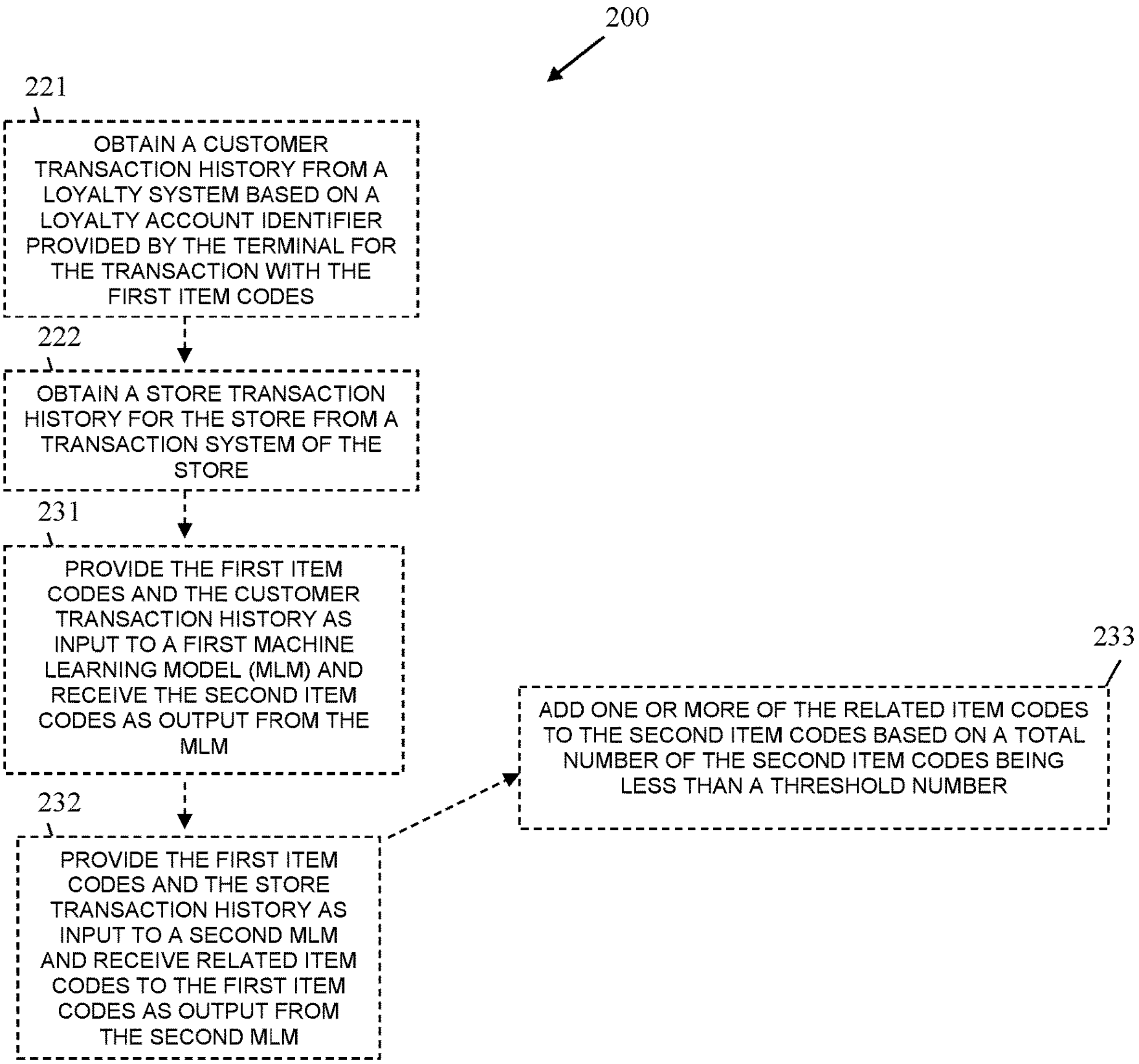
FIG. 2B is a flow diagram of additional embodiments of the method of FIG. 2A.

The above-referenced embodiments and other embodiments will now be discussed in more detail with reference to FIGS. 2A, 2B, and 3. FIGS. 2A and 2B are flow diagrams of a method 200 for in-store delayed item processing, according to an example embodiment. The software module(s) that implements the method 200 is referred to as an "item suggester." The item suggester is implemented as executable instructions programmed and residing within memory and/or a non-transitory computer-readable (processor-readable) storage medium and executed by one or more processors of one or more devices. The processor(s) of the device(s) that executes the item suggester are specifically configured and programmed to process the item suggester. The item suggester has access to one or more network connections during its processing. The connections can be wired, wireless, or a combination of wired and wireless.

In an embodiment, the device that executes the item suggester is cloud 110. In an embodiment, the device that executes the item suggester is server 110. In an embodiment, the device that executes the item suggester is a given retail server 130 of a given retailer. In an embodiment, the item suggester is all or any combination of basket manager 113, one or more MLMs 114, item pick coordinator 115, transaction manager 123, and/or item pick manager 143.

At 210 (shown in FIG. 2A), the item suggester receives first item codes for first items being processed for a transaction of a customer at a terminal 120. The terminal 120 can be an SST operated by the customer for a self-service transaction or a POS terminal operated by a cashier for a cashier-assisted transaction.

At 220 (shown in FIG. 2A), the item suggester obtains a customer transaction history for the customer associated with the transaction. In an embodiment, at 221 (shown in FIG. 2B), the item suggester obtains the customer transaction history for a loyalty system 134 based on a loyalty account identifier provided by the terminal 120 for the transaction with the first item codes.

In an embodiment of 221, and at 222 (shown in FIG. 2B), the item suggester obtains a store transaction history for the store from a transaction system 133 of the store. That is, the transaction histories of all customers of the store may be obtained by the item suggester.

At 230 (shown in FIG. 2A), the item suggester determines, from the first item codes and the customer transaction history, second item codes for second items (e.g., forgotten items) that were not included by the customer in the transaction. That is, the customer is not in possession of the forgotten items and the forgotten items remain in the store at their designated locations, but the customer is performing a checkout at the terminal 120 near an exit of the store.

In an embodiment of 222 and 230, at 231 (shown in FIG. 2B), the item suggester provides the first item codes and the customer transaction history as input to a first MLM 114. The item suggester receives the second item codes as output from the first MLM 114.

In an embodiment of 231, and at 232 (shown in FIG. 2B), the item suggester provides the first item codes and the store transaction history as input to a second MLM 114. The item suggester receives item codes corresponding to items that are related to the items associated with the first item codes as output from the second MLM 114. In an embodiment of 232, and at 233 (shown in FIG. 2B), the item suggester adds one or more of the related item codes to the second item codes based on a total number of the second item codes being less than a threshold number.

At 240 (shown in FIG. 2A), the item suggester causes an interface screen to be rendered on a display of the terminal 120 with the item details for the second items. In an embodiment, at 241 (shown in FIG. 2A), the item suggester provides the second item codes to a transaction manager 123 that executes on terminal 120. The transaction manager 123 renders the interface screen as a popup window when the customer selects a payment option to pay for the first items and complete the transaction at the terminal.

At 250 (shown in FIG. 2A), the item suggester receives a selection made by the customer through the interface screen to add one or more of the second items to the transaction. The customer is not in possession of the second items associated with the selection but completes the transaction and pays for the items of the selection at the terminal 120.

In an embodiment, at 251 (shown in FIG. 2A), the item suggester receives a third item code for a third item provided by the customer through an entry field of the interface screen. This allows the customer to select a different item from one of the second items when the customer desires to do so based on seeing the second items presented to the customer on the terminal 120.

At 260 (shown in FIG. 2A), the item suggester provides a transaction identifier for the transaction and the second item codes to an in-store picking service 115. The in-store picking service 115 manages picking of the one or more second items and delivery of the one or more second items to the customer.

In an embodiment of 251 and 260, at 261 (shown in FIG. 2A), the item suggester provides the third item code to the in-store picking service 115 along with the second item codes. As such, the customer is free to add any item that the customer may have forgotten (beyond the suggested forgotten/related items) via the entry field of the interface screen.

In an embodiment, at 262 (shown in FIG. 2A), the item suggester instructs the terminal 120 to complete the transaction with the customer and provide a second interface screen to the customer. The second interface screen identifies a designated area of the store for the customer to retrieve the second items of the selection.

In an embodiment, at 263 (shown in FIG. 2A), the item suggester instructs the terminal 120 to complete the transaction with the customer and provide a second interface screen to the customer. The second interface screen informs the customer that the selected second items will be delivered to the customer at the terminal 120 or adjacent to the terminal 120 by a store picker.

In an embodiment, at 270 (shown in FIG. 2A), the item suggester retains the first item codes and the one or more second item codes as feedback for subsequent iterations of 230 during subsequent transactions. The selection of second item codes can be relevant to a specific customer when forgotten items are being suggested and/or relevant to any customer when related items are being suggested. Thus the first item codes and the second item codes can be feedback for a training session with the first MLM at 231 and/or feedback for a training session with the second MLM 114 at 232.

Figure 3:
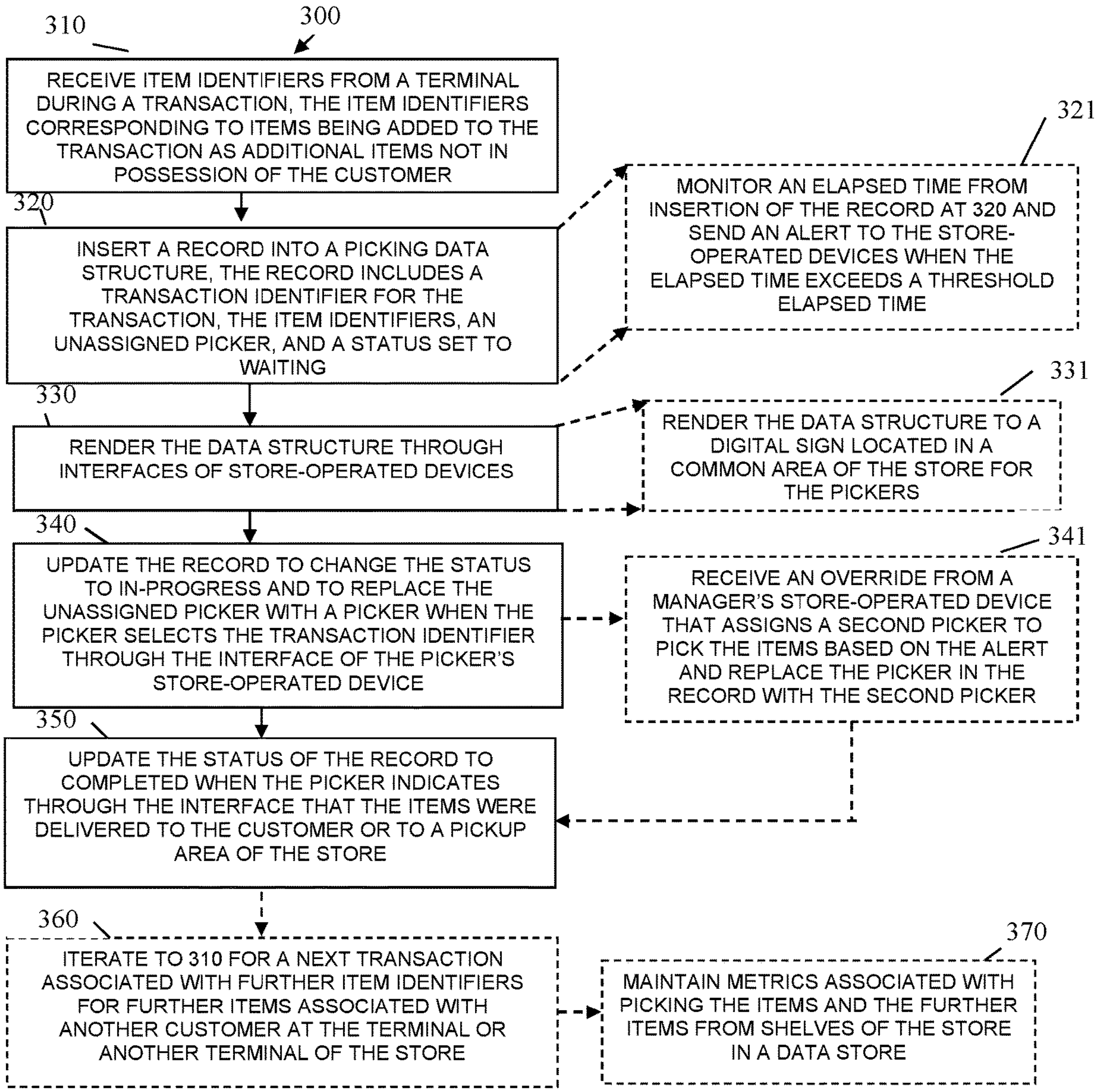
FIG. 3 is a flow diagram of another method for in-store delayed item processing, according to an example embodiment.

FIG. 3 is a diagram of another method 300 for in-store delayed item processing, according to an example embodiment. The software module(s) that implements the method 300 is referred to as an "item pick coordinator." The item pick coordinator is implemented as executable instructions programmed and residing within memory and/or a non-transitory computer-readable (processor-readable) storage medium and executed by one or more processors of one or more devices. The processor(s) of the device(s) that executes the item pick coordinator are specifically configured and programmed to process the item pick coordinator. The item pick coordinator has access to one or more network connections during its processing. The network connections can be wired, wireless, or a combination of wired and wireless.

In an embodiment, the device that executes the item pick coordinator is cloud 110. In an embodiment, the device that executes the item pick coordinator is server 110. In an embodiment, the device that executes the item pick coordinator is a given retail server 130 of a given retailer. In an embodiment, the item pick coordinator is all or any combination of item pick coordinator 115 and/or item pick manager 143. In an embodiment, the item pick coordinator represents a subset of the processing discussed above with method 200 of FIG. 2. In an embodiment, the item pick coordinator is the in-store picking service discussed above with respect to method 200 of FIG. 2.

At 310, the item pick coordinator receives item identifiers from a terminal 120 during a transaction. The items are being added to the transaction as additional items not yet associated with the transaction and not in possession of the customer at the terminal 120. In an embodiment, the terminal 120 is an SST or a POS terminal.

At 320, the item pick coordinator inserts a record into a picking data structure. In an embodiment, the picking data structure is a table or a spreadsheet. The record includes a transaction identifier for the transaction, the item identifiers, a picker field set to an unassigned value, and a status that is set to "waiting."

In an embodiment, at 321, the item pick coordinator monitors an elapsed time from insertion of the record at 320 and sends an alert to the store-operated devices 140 when the elapsed time exceeds a threshold elapsed time. So, the item pick coordinator monitors the data structure to ensure that items that need to be picked are both assigned and picked within a reasonable or set period of time.

At 330, the item pick coordinator renders the data structure through interfaces of store-operated devices 140. In an embodiment, the interfaces are user interfaces of the item pick manager 143 that execute on the store-operated devices 140. In an embodiment of 330, and at 331, the item pick coordinator renders the data structure to a digital sign located in a common area of the store for the pickers. The digital sign can be an oversized display or a standard sized display that supports touch inputs or that is interfaced to through the store-operated devices 120. This permits staff to view the data structure in its current state and proactively pick items when needed or when pick wait times are exceeding store threshold limits.

At 340, the item pick coordinator updates the record to change the status to "in-progress" and to replace the unassigned picker with an identifier of a particular picker when the picker selects the transaction identifier through the interface of the picker's store-operated device 120. In an embodiment of 331 and 340, at 341, the item pick coordinator receives an override from a manager's store-operated device that assigns a second picker to pick the items based on the alert. In response, the item pick coordinator replaces the picker with the second picker within the record of the data structure.

At 350, the item pick coordinator updates the status of the record to "completed" when the picker indicates through the interface that the items were delivered to the customer or to a pickup designated area of the store. The picker accesses the interface to indicate the items were delivered through the item pick manager 143 of the picker's store-operated device 140.

In an embodiment, at 360, the item pick coordinator iterates to 310 for a next transaction associated with further item identifiers for further items and associated with another customer at the terminal 120 or another terminal 120 of the store. That is, item pick coordinator continuously maintains an up-to-date data structure and continuously keeps a view of the up-to-date data structure rendered within the interface of the store-operated devices 120. In an embodiment, at 370, the item pick coordinator maintains metrics associated with picking the items and further items from shelves of the store in a data store. For example, the elapsed time between a customer adding the items and the items being delivered, elapsed time per picker, elapsed time per date, elapsed time per time of day, elapsed time per day of week, most frequently picked items, etc.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A system, comprising:

a server comprising a processor and a non-transitory computer-readable storage medium;

the non-transitory computer-readable storage medium comprises executable instructions; and the executable instructions when executed by the processor from the non-transitory computer-readable storage medium cause the processor to perform operations, comprising:

receiving a basket of item codes for items associated with a pending transaction on a terminal;

obtaining a transaction history for a customer associated with the pending transaction;

training a machine learning model (MLM) on the transaction history of the customer to identify likely forgotten items by considering a frequency with which particular items were purchased by the customer, a time elapsed between multiple separate purchases of a same item by the customer, and patterns of a subset of items purchased together in transactions by the customer;

providing the item codes and the transaction history as input to the MLM;

receiving at least one second item code as output from the MLM, wherein the at least one second item code represents a likely item which the customer has forgotten to obtain before initiating the pending transaction at the terminal;

causing a popup window to be rendered on a display of the terminal asking the customer whether the likely item was forgotten by the customer and whether the customer wants to add the likely item to the pending transaction;

receiving, from the terminal, a confirmation that the customer added the likely item to the pending transaction and completed the pending transaction at the terminal;

adding a record to a data structure, wherein the record includes a transaction identifier for the pending transaction, the at least one second item code, a description of the likely item, an unassigned picker, and a status set to waiting;

rendering the data structure through an interface of store-operated devices for a store associated with the terminal;

updating the record to replace the unassigned picker with a particular picker who selected the transaction identifier through the interface of a particular store-operated device of the particular picker;

updating the status of the record to in-progress based on the particular picker replacing the unassigned picker in the data structure;

updating the status of the record to completed when the particular picker indicates through the interface that the likely item was delivered to the customer or to a pickup area of the store;

training the MLM to consider factors of a particular transaction history of the customer including a frequency with which particular items were purchased by the customer, time elapsed between multiple separate purchases of a same item by the customer, patterns of a subset of items purchased together in particular transactions by the customer, wherein each pattern's frequency of occurrence, and time elapsed between separate purchases of the subset of items associated with a particular pattern; and retaining the item codes and the at least one second item code as feedback to the MLM for subsequent training iterations to improve identification of likely forgotten items during subsequent transactions.

2. The system of claim 1, wherein the terminal is a self-service terminal for self-service transactions or a point-of-sale terminal for cashier-assisted transactions.

* * * * *